June 13, 1933.  H. E. SMITH ET AL  1,913,518
LIGHT PROJECTION
Filed Jan. 13, 1931   3 Sheets-Sheet 1
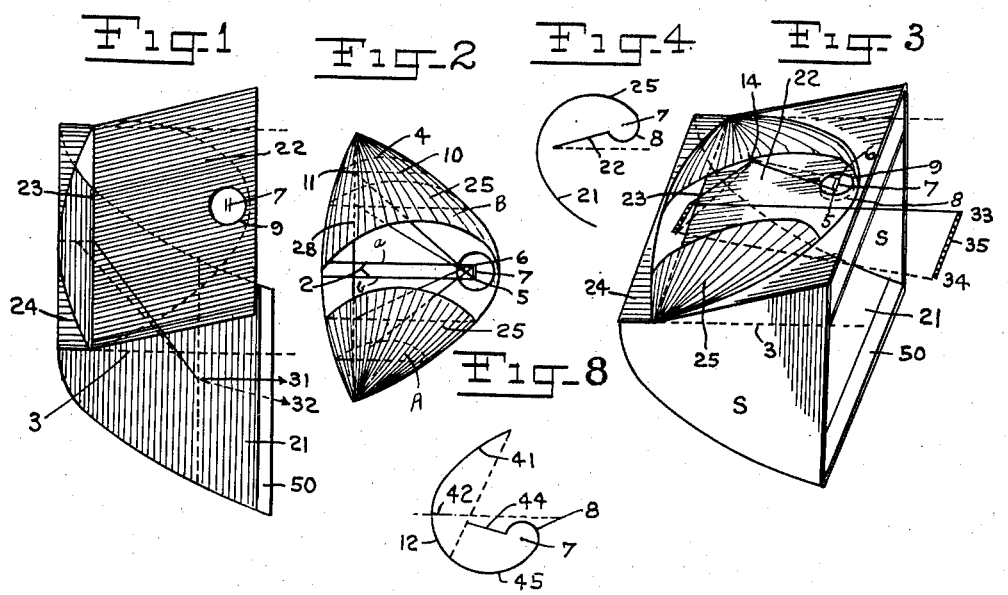
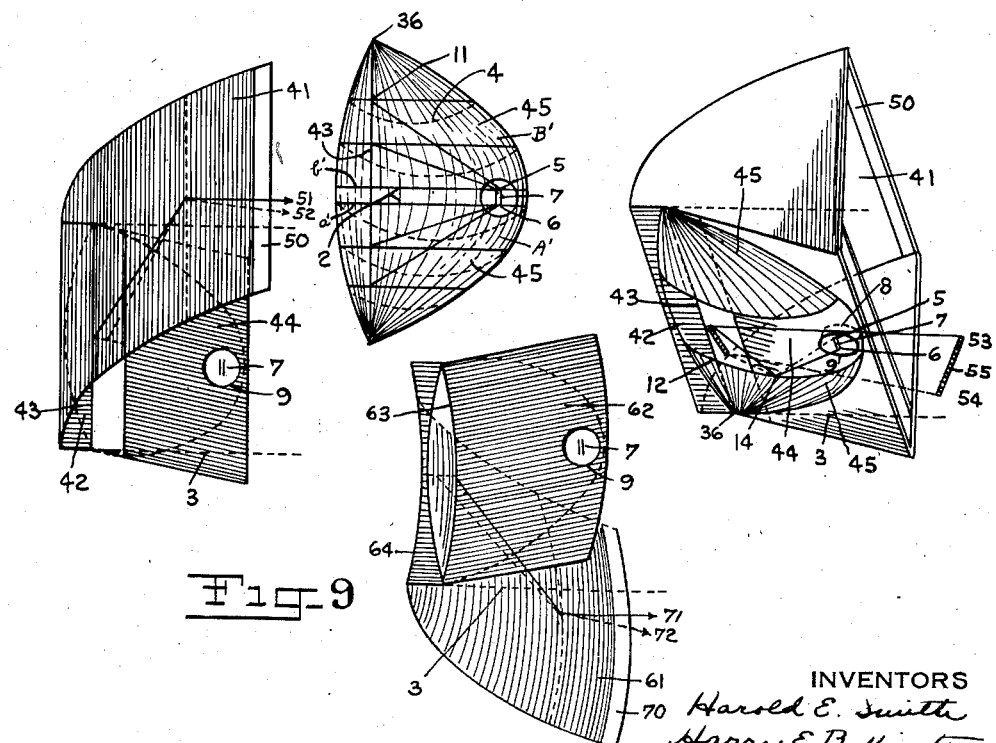
INVENTORS
Harold E. Smith
Harry E. Buffington
BY Their ATTORNEY
S. J. Cox.

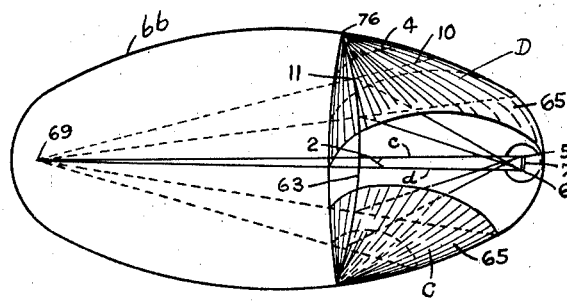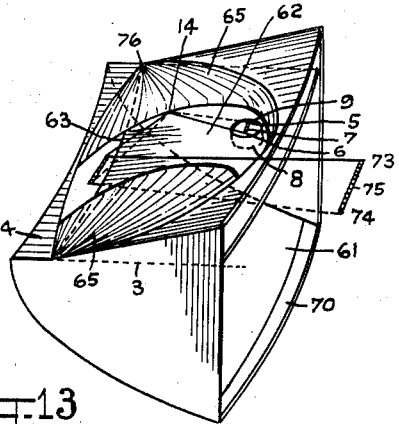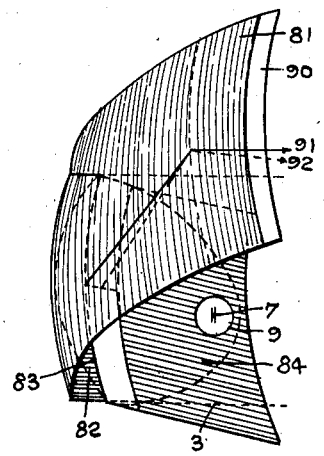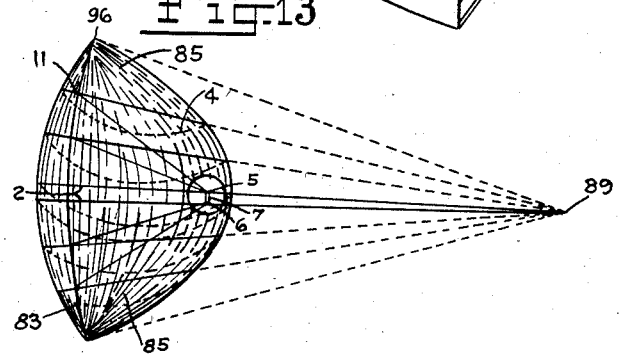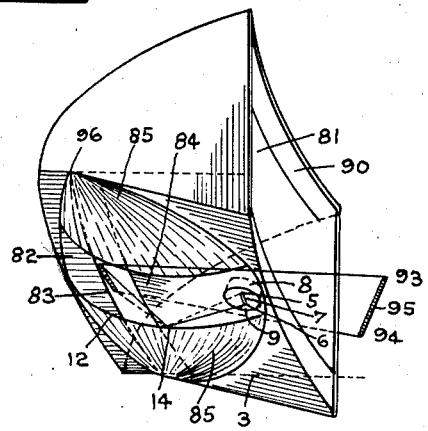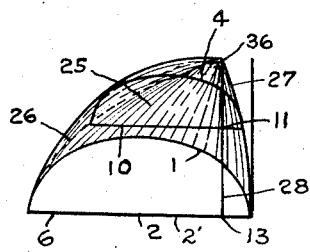

June 13, 1933.   H. E. SMITH ET AL   1,913,518
LIGHT PROJECTION
Filed Jan. 13, 1931   3 Sheets-Sheet 3
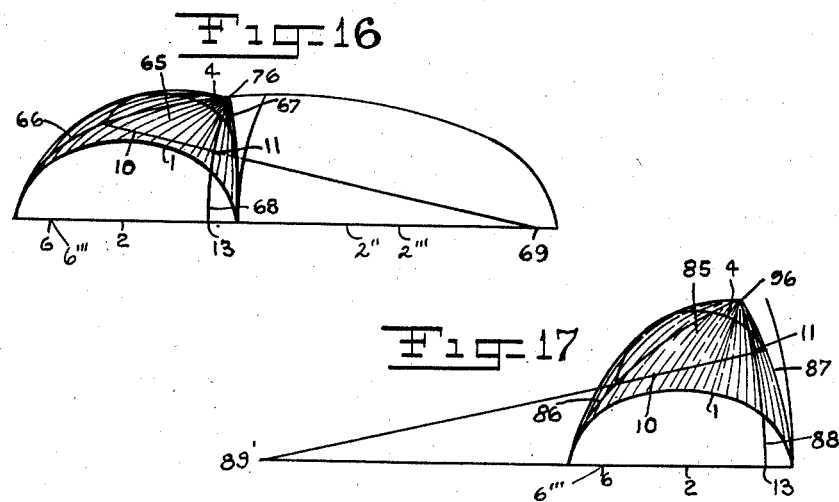
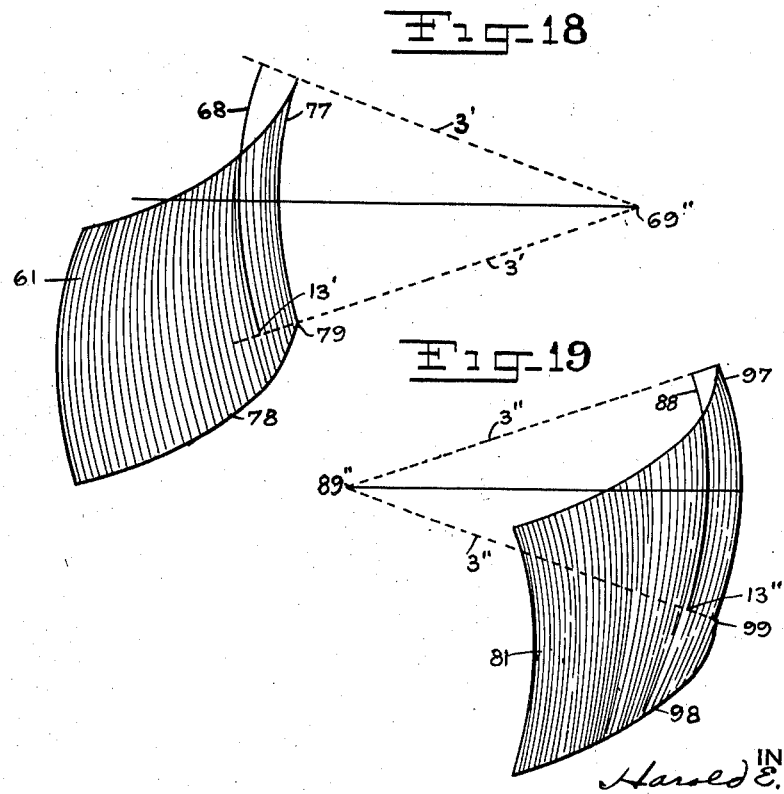

Patented June 13, 1933

1,913,518

UNITED STATES PATENT OFFICE

HAROLD E. SMITH AND HARRY E. BUFFINGTON, OF LYKENS, PENNSYLVANIA

LIGHT PROJECTION

Application filed January 13, 1931. Serial No. 508,430.

The present improvements relate to selective, arbitrary fixed control of light in its distribution, direction and intensity, and will be exemplified in their application to headlights.

In our present copending application, Serial No. 357,670, filed April 24th, 1929, we have disclosed certain types of headlights, designed to project a beam of light of the kind above mentioned. Apparatus of these types comprise a reflector having a conic-section cylindrical reflecting surface on one side of a horizontal plane containing its axes; on the other side of said plane a deflecting surface composing two families of parallel finite segments, or zones of ellipsoids; and a baffle plate interposing said surfaces, with a straight line trimming edge focused adjacent to the focal line of the cylindrical reflector.

In our original construction the vertical distribution of intensity below the horizontal is controlled by the optical properties of the selected conic section for generatrix of cylindrical reflector, while the lateral width spread of the beam is controlled by the selected width for the parallel segments of the deflector. The prevention of glare rays is insured by the novel functions of the baffle plate.

A primary object, among others, of the present improvements, is to provide a light-projecting device which prevents glare and at the same time does not sacrifice or impair the efficiency of the illumination.

Another object is to provide an illuminating device having a novel arrangement of reflecting surfaces in combination with a light source. A further object is to provide a device of the aforementioned character wherein the intensity, direction, spread, etc., of the rays may be predetermined and controlled.

A still further object is to provide an improved shield or baffle in combination with selected reflectors interrelated thereto, for compelling the projection of rays from a light source in a prescribed manner.

Another object of the improvements is to provide means to pass substantially the whole of the solid angle of emitted rays convergingly to a single line approximately parallel with the light source.

Other primary objects of the invention are to provide a headlight which has a positive prevention of glare rays to other users of the highway; which permits the employment of a relatively high candle power light source without producing corresponding increase of glare; which permits a smooth continuous surface in the structure of the ovoid reflector element so as to facilitate economic manufacture; which controls the width spread of the projected beam by the properties of the ultimate reflector, and not by the intermediate reflector as in Serial No. 357,670.

Other objects include the provision of novel elements of the combination as well as a novel arrangement thereof for regulating and controlling the rays in a new and improved manner.

Fig. 1 is a perspective view of a portion of the improvements, illustrating the cylindical reflector and the baffle correlation, also the path of certain rays.

Fig. 2 is a top view of another portion of the improvements, illustrating the ovoid reflector, with central section removed, showing its correlation with the light source.

Fig. 3 is a perspective view of one embodiment of the improvements, a portion of ovoid reflector broken away, and some parts diagrammatically illustrated, also the paths of certain rays.

Fig. 4 is a diagrammatic representation of the correlation of the elements of Fig. 3.

Fig. 5 is a perspective view of a portion of a modified form of the improvements illustrating the paths of certain rays.

Fig. 6 is a bottom-plan view of the ovoid reflector associated with a light source.

Fig. 7 is a perspective view illustrating an inverted embodiment of the improvements.

Fig. 8 is a diagrammatic representation of the correlation of the elements of the inverted type.

Fig. 9 is a perspective view of a portion of another of the improvements illustrating a warped cylindrical reflector, and the baffle plate correlation, also the paths of certain rays.

Fig. 10 is a top plan view of an ovoid reflector, with central section removed, in association with a light source.

Fig. 11 is a perspective view of another embodiment of the improvements, a portion of ovoid reflector broken away, and some parts diagrammatically illustrated, and the paths of certain rays.

Fig. 12 is a perspective view showing, in the inverted type, the correlation of warped cylindrical reflector, baffle plate, connecting member, and the paths of certain rays.

Fig. 13 is a bottom plan view of the ovoid reflector showing the converging axes of the diminishing ellipses, and the correlation of the light source with the common proximate focus of each half of the ovoid.

Fig. 14 is a perspective view of the embodiment of the improvements illustrating the association of the elements depicted in Figs. 12 and 13, with the central portion of ovoid removed, and the hemispherical reflector superposed on the connecting member, and also the paths of an image of the light source.

Fig. 15 illustrates a projection in the second quadrant of the method of generating the left half of the ovoid reflector, shown in Figs. 2 and 3.

Fig. 16 is a view similar to Fig. 15, illustrating the method of generating one-half of the ovoid reflector shown in Figs. 10 and 11.

Fig. 17 is a view similar to Figs. 15 and 16, illustrating the method of generating one-half of the ovoid reflector shown in Figs. 13 and 14.

Fig. 18 illustrates the method of generating a concavo-convex warped cylindrical surface, shown in Figs. 9 and 11.

Fig. 19 illustrates the method of generating the parabolic concavo-concave reflector shown in Figs. 12 and 14.

The four types of this invention each has four primary elements, correlated as follows:

(*a*) An ultimate cylindrical reflector positioned on one side of a horizontal plane containing its axes. The reflector is either a right cylindrical or a warped cylindrical surface adapted to project a concentrated beam of light for illuminating a roadway.

(*b*) An ovoid reflector positioned on the other side of said plane. The ovoid surface being of double curvature, and adapted to reflect all impinging rays to and on one side of a line of foci substantially coincident with the line of foci of the associated cylindrical reflector.

(*c*) A baffle plate, or light shield, interposing the cylindrical and ovoid reflectors. The baffle plate having a sharp edge trimming line positioned adjacent to said common line of foci of the reflectors, and adapted to trim off the end of the light image which originated at the proximate focus while passing from one reflector to the other. The said baffle plate is further adapted to intercept all adverse rays, so that no rays can impinge the ultimate reflector from a wrong focal or axial position.

(*d*) An elongated light source positioned in the region of the proximate foci of the ovoid reflector.

Referring to the drawings, Fig. 1 to Fig. 4 discloses one embodiment of the invention. Essentially the organization comprises an elongated light source digrammatically illustratedd at (7) Fig. 3, a hemispherical reflection (8) associated therewith and beneath said light source, a light shield or baffle plate (22), and ovoid reflector (25) above the light source and supported on said shield, a trough-like reflector (21) disposed beneath the aforementioned elements and a connecting member (24) for uniting reflectors (25) and (21). Side members S are employed to complete the opaque enclosure. As portrayed in our prior application, an opaque band or strip (50) is disposed across the lower limits of reflector (21).

The individual attributes of the various elements may be more evident upon reference to Figs. 1, 2, 3 and 15. The ultimate reflector (21) is provided as a trough-like member having preferably the shape of a parabolic cylindrical surface, so positioned as to be beneath a horizontal plane containing its axes (3) and its focal line (23), the element (22) of Fig. 1 is a plane opaque baffle plate or light shield positioned above the said horizontal plane, being inclined thereto an amount sufficient to accommodate the emplacement of hemispherical reflector (8) which is mounted in aperture (9) in said plate and depending there beneath as shown in Fig. 3, the lowermost limit of plate (22) defines a sharp straight-line trimming edge coincident with or closely adjacent to the focal line (23) of the ultimate reflector (21).

The light source (7) has been diagrammatically illustrated throughout the views. It is a straight-line filament helix of relatively small diameter being elongated and locused transversely and approximately parallel to the focal line (23) of the ultimate reflector.

Referring now to the superposed ovoid reflector, Fig. 15 shows the manner in which one-half of the elliptical parabolic reflector (25) is generated. This reflector comprises an ovoid surface locused on one side of the horizontal plane (Fig. 3) and includes two halves, but one of which is illustrated in Fig. 15. Each half comprises the geometrical figure of one specie of warped surface having a horizontal plane director, which surface is generated by a constantly diminishing ellipse (4). The three directrices (26) (27) and (28) lie in the directer plane and intersect at a common point (36): The two outer directrices (26) and (27) are arcs of parabolas having a common focus resting on the proximate focus (6) of the primitive generating ellipse (1) with their vertices on the opposite sides of a common ordinate (28), and resting on the vertices of the primitive generating ellipse (1). This common ordinate is the middle right line directrix locused perpendicular to the common axis 2' of the parabolas through the remote focus (13) of the primitive generating ellipse (1).

The axis (10) of the diminishing generatrix (4) is moved in the plane director constantly parallel to the axis (2) of the primitive generating ellipse (1), with the diminishing ellipses vertices resting on the outer directrices (26) and (27), and their remote foci (11) resting on the right line common ordinate (28). The other half of the ovoid reflector is generated in a similar manner, the primitive generating ellipse having a proximate focus designated (5) in Fig. 2.

In assembled relation, the two halves "A" and "B", Fig. 2, comprising the elliptical parabolic ovoid reflector (25) are superposed on the baffle plate (22), so that the foci (5) and (6) rest on the far ends of the light source (7) with the line of remote foci comprising foci (13) (see Fig. 15), substantially coincident with focal line (23) (see Fig. 3), and therefore parallel to said light source. In thus positioning the halves comprising the ovoid reflector (25) the axis (2) and "a" of the primitive generating ellipse for the one half "A" is locused within the other half "B" and parallel to the axis (2) and "b", and the proximate focus of each half locused on the far ends of the light source, thus the light source is between the two proximate foci (5) and (6). This relation of the foci causes substantially all rays, not of focal origin, impinging any portion of the ovoid (25) to be reflected beyond its line of remote foci.

In Figs. 2 and 3, a section or zone of the ovoid reflector (25) has been removed to more clearly illustrate the relation of parts. In those figures, it is manifest, that the ordinate (28) containing foci (13) of Fig. 15, coincides substantially with focal line (23) of Fig. 3, so that a portion of the reflector (25) projects beyond the image trimming edge of plate (22), forming therewith an outlet for rays to reflector (21). The association of the elements is shown graphically in Fig. 4.

In use, rays emitted downwardly by source (7), are reflected convergingly upward through the region of the light source by the hemispherical auxiliary reflector (8) so as to impinge ovoid reflector (25). Rays emitted upwardly impinge said reflector also and are reflected so as to pass over the edge of baffle plate (22), at or to the rear of focal line (23). Due to the character and location of this reflector (25) the rays of focal origin emitted divergently from the light source, impinge the reflector and are reflected convergingly in parallel vertical planes to a single horizontal line, while all rays, other than of focal origin, are reflected substantially to and on one side only of said single horizontal line. Accordingly, this arrangement combined with plate (22) as described, causes images of the light source to pass over the edge of said plate to reflector (21) in such a manner that no rays can reach said reflector without passing on one side only of the ray trimming edge of the plate, whence the rays are projected by reflector (21) only in and beneath a horizontal direction.

In Fig. 1, a ray (31) passing over the baffle plate edge and through the focal line (23) to impinge the cylindrical reflector (21) is projected forward in a horizontal plane. A ray (32), passing rearward of focal line (23) and impinging the same point of surface (21), is projected downwardly and forwardly in a plane beneath the horizontal.

In Fig. 3, a ray of light (33), origin at the proximate focus (5), and impinging any point, as at (14), of that side of the ovoid (25) which has (5) as its proximate focus, is reflected adjacent to the trimming edge of the baffle plate, and is projected by the ultimate reflector (21) in a horizontal plane and parallel to axis (3). A ray, (34), origin at the extreme other end (6) of the light source (7), and impinging the same point (14) is reflected to the right of the focal ray projection in a downwardly direction. The whole image (35) of the light source (7) passes over the baffle plate as a straight line having the end which originated at the proximate focus trimmed thereby. Accordingly, a composite beam of highly concentrated light is projected to a roadway in and beneath a horizontal direction without producing glare, having the limit of the upward extent of the beam accurately and sharply defined.

When it is required to meet a changed specific vertical distribution of the intensity, we employ a hyperbola, or a compound hyperbola for the directrix of the ultimate reflector (21), whereby a selected quantity of the rays are projected to the rear and to the intermediate parts of the roadway.

Referring to the embodiment illustrated in Figs. 5, 6, 7, and 8, the general construction and arrangement are substantially similar to those of the prior figures, with the exception that the elements are inverted. In this type the ultimate cylindrical reflector (41) is positioned above the horizontal plane. The baffle plate (42) extends rearwardly from the focal line (43) of the ultimate reflector (41) to the reflector's line of vertices.

The opaque connecting member (44) inclines upwardly toward the focal line (43) of the ultimate reflector (41). The hemispherical auxiliary reflector (8) superposes the connecting member (44), being mounted in an orifice (9) of said member, in which is also positioned the light source (7) parallel to the line of foci (43) of the cylindrical reflector.

The elliptical-parabolic ovoid reflector (45), subposes the connecting member (44), having the line of remote foci substantially coincident with the focal line (43) of the ultimate reflector (41). The axes of the ovoid reflector rest in the plane of the connecting member (44).

The proximate focus (6), see Fig. 15, of the primitive generating ellipse (1), of one-half of the ovoid surface is separated away from the proximate focus (5), see Fig. 6, of the other half, with the light source positioned between them, having the near ends of the light source (7) resting on the proximate foci (5) and (6). Accordingly, the axes of the primitive generating ellipses do not overlap as in the form first described.

While the halves "A'" and "B'" of this reflector (45) are formed in the same manner as those employed for reflector (25), Fig. 3, i. e. in the manner disclosed in Fig. 15, they are assembled so that the planes containing the axes (2) do not overlap. Accordingly, the axis (2) of half "A'", designated "a'" in Fig. 6, and the axis (2) of the half "B'", designated "b'", are on near ends of the light source. Thus the light source is again wholly between foci (5) and (6), but in a different manner than in the embodiment first described. Hence, each path of the reflector (45) has its own focus locused, a distance equal to one-half the length of the light source, within its own half. This relation of the foci causes all rays, not of focal origin, impinging any portion of the ovoid (45) to be reflected within its line of remote foci. A rearward portion (12), see Fig. 8, of the ovoid surface (45) is rendered opaque to destroy certain rays which otherwise would be projected adversely. The association of the elements is shown graphically in Fig. 8.

In this inverted type, when it is required to meet a changed vertical distribution of intensity, we may employ an ellipse, or a compound ellipse for the generatrix of the cylindrical surface (41).

In Fig. 5, a ray (51) passing over the baffle plate edge and through the focal line (43) to impinge the cylindrical reflector (41), is projected forwardly in a horizontal plane. A ray (52) passing forwardly of line 43, and impinging the same point of surface (41) is projected forwardly and downwardly in a plane beneath the horizontal. In this inverted type, therefore, the rays reach the reflector (41) at or in advance of focal line (43).

In Fig. 7, the rays (53) and (54) are the projections of the focal origin ray and the extreme ray impinging on the same point (14) of the ovoid reflector, having the straight line image (55) between them. The mode of operation, functions and results, of this embodiment are substantially similar to those of the combination described in Fig. 3.

In Figs. 9, 10 and 11, we disclose our preferred form of the invention, having the elements correlated and associated similar to the combination shown in Fig. 3. The concavo-convex warped cylindrical reflector (61) is locused beneath a horizontal plane containing its axes (3), Figs. 9 and 11. In this combination, each half of the ovoid surface (65) above the horizontal plane is an ovoid reflector of warped surface double curvature.

The proximate focus (6) of the primitive generating ellipse (1), see Fig. 16, of the one half, overlaps the proximate focus (5) of the other half, as illustrated in Fig. 10. In other words, the halves, "C" and "D" of the reflector (65) are locused in a manner similar to the halves "A" and "B" in Fig. 2. In Fig. 10, this relation of parts is more clearly apparent by observing the location of axes (2) of the halves "C" and "D," designated respectively "c" and "d". The axes (2) of the primitive generating ellipse (1) converge to the remote focus (69) of the directrix ellipse (66), see Fig. 16. The axes (10) of all the diminishing ellipses (4) which comprises the reflector surface (65) converge to same said point (69), and rest substantially in the plane of the baffle plate (62).

The line of remote foci of the diminishing ellipses (4) of the ovoid reflector (65) approximately coincide with the line of foci (63) of the warped cylindrical reflector (61). The baffle plate (62) interposing both reflectors, has its trimming edge curved to substantially coincide with the curvature of the line of foci (63) of the ultimate reflector (61).

Fig. 16 shows the manner in which half of the warped surface reflector (65) is generated. This is an ovoid surface similarly designed and generated as in Fig. 15. Herein the two outer directrices (66) and (67) are arcs of conic sections having their axes (2") and (2''') in a common line. The one, (66), being an ellipse, with its proximate focus coincident with the proximate focus (6) of the primitive generating ellipse (1), and also coincident with the inner focus (6''') of the hyperbola (67) and having the proximate vertices of both ellipses coincident. The other outer directrix (67) being a hyperbola, having its outer focus coincident with the remote focus (69) of the directrix ellipse (66). The vertex of the hyperbola rests on the remote vertex of the primitive generating ellipse (1). The middle directrix (68) is an arc of a circle through the remote focus (13) of the primitive generating ellipse (1). Said circular arc has the outer focus of the hyperbola which is at (69) as its center, and is convex toward the proximate focus (6).

The axis (10) of the diminishing generating ellipse (4) is moved in the directer plane constantly converging to a common point resting on the outer focus (69) of the hyperbola, with the diminishing ellipses vertices resting on the outer directrices (66) and (67), and their remote foci resting on the middle arc directrix (68).

The reflector (61) of Fig. 11 is illustrated in Fig. 18 where a concavo-convex reflector is shown generated as a warped cylindrical surface having a horizontal plane directer. It has, as a generatrix, the arc of a conic section, for example, the parabola (78) in Fig. 18. In the plane director are two concentric circular arcs (68) and (77) as directrices. Said arcs have a common center in point (69'') rearward of the vertex (79) of the parabola. The parabolic generatrix (78) being moved on the director plane with its axes converging to common point (69'') which point is a distance from the focal arc (68) substantially equal to the distance between the remote focus of the primitive generating ellipse and the outer focus of the hyperbola employed to delineate the one outer directrix (67) of the associated ovoid reflector, having the generatrix focus (13') resting on arc (68) and the vertex (79) resting on arc (77). The ultimate reflector is a concavo-convex warped cylindrical surface, see Fig. 18, but may have the concavo curvature generated by a parabola, or by a hyperbola, or a compound hyperbola when an arbitrarily selected variable distribution of the vertical spread of the rays is desired.

The elongated light source (7) is locused transversely between the overlapping proximate foci of the ovoid reflector, see Fig. 10. The hemispherical auxiliary reflector (8) subtends the light source.

In this preferred type the lateral width spread of the projected image of the light source is controlled by the fixed length of the light source, plus the lateral direction of the focal end (73) of the image (75). The focal ray spread is determined by the axial divergence from center of curvature (69) of the parabolic element (78) containing the point of impingement. The shorter the radius of the arc for the line of foci (68) of Fig. 18, the wider the later divergence of the focal ray. All the rays from other than focal origin are projected sloping downwardly and inwardly toward the opposite side.

In Fig. 9 the rays (71) and (72) are the projection of rays passing through the focus and rearward of the focus and impinging the same point of the ultimate reflector (61).

In Fig. 11 the projections (73) and (74) show the paths of the focal and of the extreme rays impinging the same point (14) of the ovoid reflector (65), having the straight line image (75) between them. The functions and results are substantially the same as those mentioned in Fig. 3, with the added function of arbitrarily controlling the width spread of the projected beam.

In Figs. 12, 13, 14 and 8, we show the invented type, herein the ovoid (85), as generated in Fig. 17 is associated with a warped concavo-concave cylindrical reflector (81) as generated in Fig. 19. Said warped cylindrical reflector is positioned above the horizontal plane. The baffle plate (82) extends rearward from the line of foci (83) of the warped cylindrical reflector (81) to the line of reflector's vertices. The light source (7) is positioned between the separated proximate foci (6) and (5). The hemispherical auxiliary reflector (8) is above the connecting member (84) which inclines upwardly toward the line of foci (83) of the ultimate reflector (81).

Fig. 17 shows the manner in which the ovoid reflector (85) is generated. This is an ovoid surface similarly designed and generated as Fig. 15 and 16. Herein the two outer directrices are also arcs of conic sections, having their axes in a common line, and their foci coincident. The one outer directrix (86) is the hyperbolic arc having its inner focus (6''') resting on the proximate focus (6) of the primitive ellipse (1). The hyperbola's outer focus (89') rests on the remote focus of the directrix ellipse (87). The hyperbola's vertex rests on the proximate vertex of the primitive generating ellipse (1). The other outer directrix (87) is the ellipitical arc. The middle circular arc directrix (88) is concave toward the proximate focus (6) of the primitive generating ellipse (1). The diminishing ellipses (4) are moved in the plane directer with their axes (10) constantly converging to the outer focus (89') of the hyperbola. The vertices and remote foci of the diminishing generating ellipses rest on the directrices same as that above described in Figs. 15 and 16.

Fig. 19 illustrates a concavo-concave reflector comprising a warped cylindrical surface (81) generated similarly to Fig. 18.

Herein the focus 13″ rests on the directrix (88) and the vertex (99) rests on (97). The axes (3″) of the generatrix (98) converge to a common point (89″) forward of the vertex.

This modified form of the invention has substantially the same functions and results as the last combination above, Fig. 11, with this difference, the converging of the axes of the ultimate reflector (81) to a common point (89″) forwardly, causes the paths of the focal origin rays to cross in a cusp to the front of the car from which cusp they then diverge. In Fig. 12 the rays (91) and (92) are the projection of rays through the focus and forward of the focus and impinging the same point of the ultimate reflector (81). In Fig. 14 the projections (93) and (94) show the paths of the focal and the extreme rays impinging the same point (14) of the ovoid reflector (85), having the straight line image between them.

It is understood that in obtaining the continuous whole ovoid of the overlapping foci type, we employ slightly less for each half than is shown in the structures illustrated in Figs. 15 and 16, while for each half in the separated foci type, we obtain the continuous surface by employing slightly more of the structure than is shown in said figures.

In our prior pending application, Serial No. 357,670, the horizontal width distribution of the focal origin ray is controlled by the width of segments or zones of the intermediate reflector; in the present application it is controlled by the direction given the vertical planes, which planes contain the paths of all reflected focal rays, whereby a greater arbitrary control of width spread is obtained in the present application, ranging substantially from a maximum lateral concentration of the width of the ovoid only to substantially 180 degrees. Such structure provides a smooth continuous surface and thereby cheapens and facilitates manufacture.

For other than focal origin rays, the present application will allow the installment of a longer light source without producing excessive width spread. In the elliptical parabolic ovoid, when used for road illumination, the width spread is only obtained by the arbitrary selected length of the filament, whereby a greatly enlarged light source may be employed, and yet not produce excessive width spread.

The width spread of the focal origin ray in the warped cylindrical surface is arbitrarily controlled by the curvature of the horizontal element of the surface; whereby a wider range of width distribution is obtained; and whereby also a greater rigidity of structure by the double curvature of the surface is obtained.

As to the ovoid and the ultimate reflectors combined, the present application permits both surfaces to be manufactured of glass, and mirrored with a permanently protected surface, insuring a continued efficiency; and whereby the catoptical properties of the ovoid operate as designed, without adverse interference from the dioptical properties of the glass, while in the prior application, where the segments are joined laterally, the prismatic step would be inoperative for purpose designed, when made of glass.

Various modifications and rearrangements of the parts and shape of light source, within the scope of present improvements, may occur to those skilled in the art and may be adopted without departing from the scope and purview of the invention.

We claim:

1. In combination with a baffle plate having a horizontal concave line light trimming edge at the front, a transversely elongated light source forward of said trimming edge, an ovoid reflector beneath the plane of the baffle plate inclined upwardly toward said trimming edge, each side of said ovoid reflector comprising a warped surface composed of an infinite series of consecutively diminishing ellipses whose axes converge in a common plane to substantially a remote point forwardly, having the proximate focus of the primitive generating ellipse of each side separated away from the other and locused in the near end of the light source, and the remote foci of the diminishing ellipses resting in a common curvilinear line substantially concentric with and closely adjacent to said trimming edge, and a concavo-concave warped cylindrical reflector locused above a horizontal plane containing its converging axes, having its line of foci concentric with and closely adjacent to said trimming edge and substantially coincident with the line of remote foci of the ovoid reflector.

2. A light projector comprising a focalizing warped cylindrical reflector positioned above a horizontal plane containing its focal line, a plane light shield positioned beneath said reflector and extending forwardly from the line of vertices of said reflector and having a front curvilinear line light trimming edge, said edge terminating approximately concentric with and closely adjacent to the focal line of the reflector, a light source positioned forward of and below said reflector and its focal line, and reflector means extending from in front of the light source to the lower edge of the warped cylindrical reflector to compel substantially all the rays from the light source to converge toward the said cylindrical reflector and to cause substantially every ray of light to reach the said cylindrical reflector by crossing through or in front of its curvilinear focal line, but not in the rear thereof.

3. In combination with a baffle plate having a curvilinear line light trimming edge, a light source forward of said trimming edge, an ovoid reflector of conic section double curvature on one side of a plane containing said baffle plate, each side of said ovoid reflector comprising a warped surface composed of an infinite series of consecutively diminishing ellipses whose axes converge in a common plane to substantially a common point, having the proximate focus of the primitive generating ellipse for each half resting in the region of the opposite sides of the light source and the remote foci of all the diminishing ellipses resting on a common curvilinear line substantially concentric with and closely adjacent to the said curvilinear trimming edge, and a warped cylindrical reflector having an arc of a conic section in vertical section and a curvilinear line in horizontal section, said cylindrical reflector being positioned on one side of a horizontal plane containing its converging axes and having the light source positioned on the other side of said horizontal plane, said reflector having its line of foci substantially coincident with the line of remote foci of the ovoid reflector.

4. In combination with a baffle plate having a rear concave line light trimming edge, a transversely elongated light source forward of said trimming edge, an ovoid reflector superposing said baffle plate, each side of said reflector comprising a warped surface composed of an infinite series of consecutively diminishing ellipses whose axes substantially in the plane of the baffle plate converge to a remote common point rearwardly, having the proximate focus of the primitive generating ellipse for each half locused within the other half, and positioned in the far end of the light source, and the remote foci of all the diminishing ellipses resting on a curvilinear line closely adjacent to said trimming edge, and a concavo-convex warped cylindrical reflector, parabolic in section by a normal vertical plane and circular in horizontal section, positioned beneath a horizontal plane containing its converging axes and having its line of foci approximately coincident with the line of remote foci of the ovoid reflector.

5. A light projector comprising a focalizing warped cylindrical reflector positioned beneath a horizontal plane containing its curved focal line, a substantially plane light shield positioned above said reflector and having a rear curvilinear line light trimming edge, said edge terminating approximately concentric with and closely adjacent to the focal line of the reflector, a light source positioned forward of said reflector and its focal line and above said light shield near the front end thereof, and reflector means extending from in front of the light source to the upper edge of the warped cylindrical reflector to compel substantially every ray of light to reach the said cylindrical reflector by crossing through or in the rear of its curvilinear focal line, but not in front thereof.

6. In combination with a warped cylindrical reflector positioned on one side of a horizontal plane containing its converging axes and curvilinear line, said reflector having an arc of a conic section in vertical section and a curvilinear line in horizontal section, a light source forward of said reflector and on the other side of said horizontal plane, reflector means extending from the line of vertices of the warped cylindrical reflector to in front of said light source and substantially surrounding said light source to compel the rays from the light source to converge to the region of the curvilinear focal line of the said reflector, and a baffle plate having a curvilinear line light trimming edge, said edge being positioned substantially concentric with and closely adjacent to the focal line of the said warped cylindrical reflector, said baffle plate having its other edge, remote from the light trimming edge, extending to one end of said reflector means, whereby the said baffle plate prevents any rays from passing to the said cylindrical reflector which after reflection by said cylindrical reflector will pass out as glare rays.

Witness our hands this 8th day of January, 1931, county of Dauphin, State of Pennsylvania.

HAROLD E. SMITH.
HARRY E. BUFFINGTON.